E. J. LEVINE.
PUZZLE.
APPLICATION FILED JAN. 20, 1909.
932,147.  Patented Aug. 24, 1909.
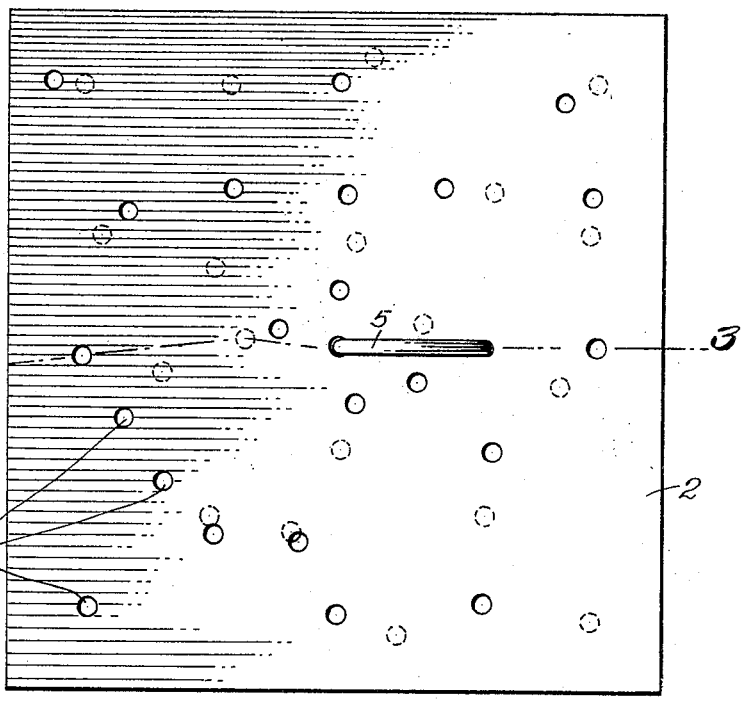
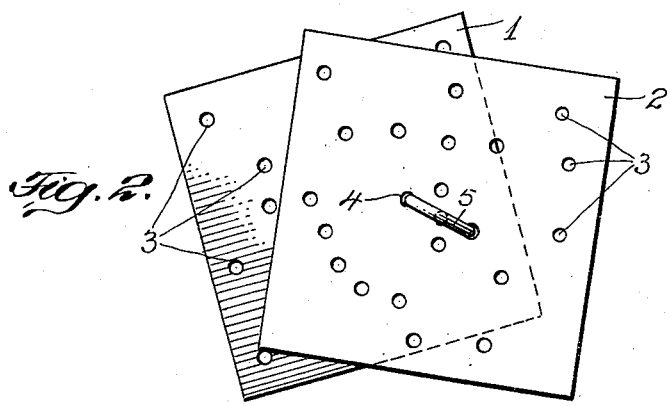
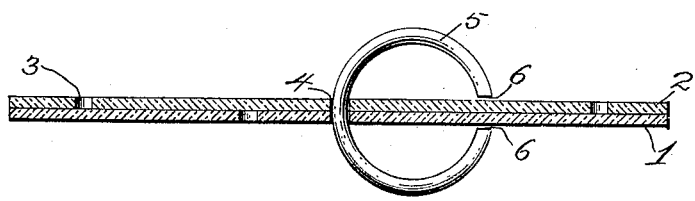
Witnesses:  Edmund J. Levine
  Inventor
By Attorney

UNITED STATES PATENT OFFICE.

EDMUND J. LEVINE, OF NEW YORK, N. Y.

PUZZLE.

932,147.  Specification of Letters Patent.  Patented Aug. 24, 1909.

Application filed January 20, 1909. Serial No. 473,340.

*To all whom it may concern:*

Be it known that I, EDMUND J. LEVINE, a citizen of the United States, residing in the borough of Manhattan, city, county, and State of New York, have invented a certain novel form of Puzzle, of which the following is a specification.

My invention relates to a novel form of puzzle.

The invention includes a plurality of plates and an open or incomplete ring designed to be moved through perforations formed in the plates until the ring passes through central registering perforations or goal holes in the two plates.

An embodiment of the invention is illustrated in the accompanying drawing, wherein—

Figure 1 is a plan view of two superposed plates having the ring passed through the central registering perforations; Fig. 2 is a view illustrating the two plates out of true; and Fig. 3 is a horizontal sectional view taken on the line 3—3 of Fig. 1.

Referring to the drawing by reference characters 1 and 2 designate plates of any desired material, preferably celluloid or similar composition, each of the plates being provided with a plurality of perforations 3 arranged irregularly throughout a portion of the plate's area and each plate has also an approximately central perforation 4, the two perforations 4 being in exact registry when the plates are superposed and in true.

5 designates an open ring having the spaced apart ends 6. This ring is preferably made of a yielding material, fairly stiff, such as rubber or celluloid, wood or metal.

In working out the puzzle an end 6 of the ring is passed through two perforations somewhere near the edges of the plates 1 and 2, the plates for this purpose being so placed as to cause two perforations therein to register. The ring is then worked toward the center by passing an end thereof through two other perforations which must of course be in registry, and this operation is continued until the plates are exactly in true and the central perforations or goal holes therein register, when the ends of the ring may be passed therethrough.

Having thus described my invention, what I claim as new and desire to secure by Letters Patent is:—

A puzzle of the character described, comprising a plurality of plates each of which is provided with a number of irregularly arranged perforations and only the central perforations registering when the plates are superposed and in true, and an open ring the diameter of which is equal to the distance between some of said perforations whereby the said ring may without detaching the same from the plate be passed successively from the edge of the plates through the said perforations until the central registering perforations have been reached.

In witness whereof I have hereunto affixed my signature in presence of two witnesses.

EDMUND J. LEVINE.

Witnesses:
SAMUEL C. STEINHARDT,
EVA LOFFER.